United States Patent [19]

Grange

[11] Patent Number: 5,072,216
[45] Date of Patent: Dec. 10, 1991

[54] REMOTE CONTROLLED TRACK LIGHTING SYSTEM

[76] Inventor: Robert Grange, 401 E. 74th St., New York, N.Y. 10021

[21] Appl. No.: 447,566

[22] Filed: Dec. 7, 1989

[51] Int. Cl.[5] .......................... H04Q 9/00; F21P 5/02
[52] U.S. Cl. ...................... 340/825.520; 340/310 R; 340/310 A; 362/233; 362/802; 315/292; 315/293; 315/315
[58] Field of Search .......... 340/310 R, 310 A, 825.52, 340/825.56, 825.06, 825.07, 310 CP; 315/292, 293, 361, 312–316; 362/147, 233, 802

[56] References Cited

U.S. PATENT DOCUMENTS

| | | |
|---|---|---|
| 2,944,188 | 7/1960 | Lohr et al. . |
| 3,697,975 | 10/1972 | Bernstein et al. ......... 340/310 CP X |
| 4,057,751 | 11/1977 | Bonsignore et al. . |
| 4,095,100 | 6/1978 | Selick . |
| 4,125,767 | 11/1978 | Silver . |
| 4,144,478 | 3/1979 | Nuver . |
| 4,153,860 | 5/1979 | Vonick . |
| 4,177,405 | 12/1979 | Chapdelaine . |
| 4,180,803 | 12/1979 | Wesemeyer et al. ........ 340/310 R X |
| 4,200,862 | 4/1980 | Campbell et al. ............... 340/310 A |
| 4,217,646 | 10/1980 | Caltagirone et al. ........... 340/310 R |
| 4,242,614 | 12/1980 | Vatis et al. . |
| 4,249,160 | 2/1981 | Chilvers . |
| 4,277,727 | 7/1981 | Le Vert . |
| 4,293,846 | 10/1981 | Allison ........................... 340/310 A |
| 4,331,914 | 5/1982 | Huber . |
| 4,388,566 | 6/1983 | Bedard et al. . |
| 4,388,567 | 6/1983 | Yamazaki et al. . |
| 4,418,333 | 11/1983 | Schwarzbach et al. ... 340/825.07 X |
| 4,523,128 | 6/1985 | Stamm et al. . |
| 4,535,401 | 8/1985 | Penn ........................... 340/825.06 X |
| 4,595,860 | 6/1986 | Taylor . |
| 4,598,345 | 7/1986 | Kleeman . |
| 4,629,941 | 12/1986 | Ellis et al. . |
| 4,684,822 | 8/1987 | Angott ........................ 340/310 A X |
| 4,688,154 | 8/1987 | Nilssen ................................ 362/147 |
| 4,689,547 | 8/1987 | Rowen et al. . |
| 4,716,344 | 12/1987 | Newell et al. . |
| 4,727,296 | 2/1988 | Zaharchuk et al. . |
| 4,733,138 | 3/1988 | Pearlman et al. . |
| 4,745,351 | 5/1988 | Rowen et al. . |
| 4,758,767 | 7/1988 | Blake . |
| 4,792,731 | 12/1988 | Pearlman et al. . |

FOREIGN PATENT DOCUMENTS 2339970  2/1975  Fed. Rep. of Germany ...... 315/292

*Primary Examiner*—Donald J. Yusko
*Assistant Examiner*—Ashok Patel
*Attorney, Agent, or Firm*—Anthony J. Casella; Gerald E. Hespos

[57] ABSTRACT

A track lighting system is provided including a power track electrically connected to electrical power lines in a building. A plurality of track lighting units are selectively engageable with the power track. Each track lighting unit includes a signal responsive switch that responds to signals transmitted over the power lines of a building. The track lighting system further includes a transmitter that is selectively engageable with the power circuitry to transmit signals to control the operation of the signal responsive switches and the track lighting units to which the switches are operatively connected.

3 Claims, 2 Drawing Sheets

REMOTE CONTROLLED TRACK LIGHTING SYSTEM

BACKGROUND OF THE INVENTION

Prior art track lighting systems comprise elongated power tracks that are mountable to a ceiling or other interior surface of a building. The power tracks include a longitudinally extending channel on the side thereof facing away from the ceiling or other such mounting surface in the building. Disposed within the channel are one or more pairs of parallel conductors that are electrically connected to the electrical power lines of the building at a junction boxes or the like disposed in the ceiling.

Prior art track lighting systems further include at least one, and generally a plurality of track lighting units that are electrically and mechanically engageable in the channel of the power track mounted to the ceiling or other such mounting surface in the building. More particularly, the track lighting units include a base having a pair of electrical contacts mounted thereto. The portion of the base to which the contacts are mounted is dimensioned to be urged into the channel of the power track. Additionally, the base includes appropriate means for selectively moving the contacts thereof into electrical engagement with the elongated conductors of the power track. The contacts of the base are electrically connected to a light socket in the track lighting unit. Thus, the light socket can be selectively placed in electrical connection with the elongated conductors of the power track.

The outlet or junction box to which the power track is connected generally is operatively controlled by a switch disposed in a wall or other convenient location that is spaced from the power track. The switch is operative to complete a circuit, thereby directing current to the power track and enabling the simultaneous lighting of the bulbs of all track lighting units mounted to the power track of the system. The switch may include known dimming means to enable the simultaneous and uniform dimming or brightening of all track lighting units mounted to the power track.

The above described track lighting systems are used in a wide range of residential, office, commercial and institutional applications where it is desirable to illuminate specific locations in addition to illuminating an entire room. Thus, track lighting systems are widely employed in museums and art galleries where specific wall hangings are to illuminated and accented. Similarly, track lighting systems are employed to emphasize commercial displays in retail establishments, architectural displays in office buildings, specific tables in a restaurant and various other items of interest or importance in virtually any building. Among the desirable features of track lighting systems is the ability to move the various track lighting units longitudinally relative to the power track as lighting needs change. For example, lighting requirements may vary as commercial displays are changed, as furniture is rearranged or as new art gallery exhibits open.

In addition to changing the locations of track lighting units, it is often desirable to provide more or less illumination in certain areas as compared to other areas. With prior art track lighting systems, this can be accomplished by selectively adding or removing track light units to the power track or by changing bulbs in individual track lighting units to a smaller or larger wattage. This approach can be extremely time consuming and awkward. In this regard, it is to be understood that the ceilings in many commercial, office, industrial or institutional buildings are quite high, and the power tracks mounted thereto are not easily accessible. Furthermore, it may often be necessary to experiment with the various lighting options to achieve a desired effect.

Some prior art track lighting systems include a power track having plural circuits (typically up to five circuits) which are separately controllable. Thus, one track lighting unit in a power track may be disposed on one circuit, while the track lighting unit adjacent thereto is disposed on a separate circuit on the same power track. Multi-circuit track lighting systems are very significantly more expensive than single-circuit track lighting systems. Additionally, multi-circuit track lighting systems require multiple circuit wiring to be incorporated into the building in which the track lighting system is installed. In most situations, the plural circuits are not pre-existing in the building, and costly electrical work must be completed before the expensive multiple circuit track lighting system can be installed. This electrical work will require the installation of separate controls for each circuit in the power track. Even when such a system is installed, it is likely that the arrangement of circuits will not conform to each lighting need. As a result, it will be necessary to periodically make direct adjustments to the track lighting units. Furthermore, limitations as to the possible number of circuits that can be incorporated into the track will constrain the system. Five circuits defines a practical limit for even the most complicated and costly multi-circuit track lighting system.

As noted above, the multiple circuit track lighting systems are significantly more expensive than single circuit track lighting systems. These cost differentials can increase dramatically as the size of the room or building increases. In particular, the circuitry required for large art galleries, exhibition halls, conference rooms, and large commercial spaces can be extraordinarily expensive. Examples of complex expensive lighting systems for separately controlling individual lighting units are shown in: U.S. Pat. No. 4,792,731 which issued to Pearlman et al. on Dec. 20, 1988; U.S. Pat. No. 4,689,547 which issued to Rowen et al. on Aug. 25, 1987; U.S. Pat. No. 4,733,138 which issued to Pearlman et al. on Mar. 22, 1988; U.S. Pat. No. 4,388,566 which issued to Bedard et al. on June 14, 1983; U.S. Pat. No. 4,242,614 which issued to Varis et al. on Dec. 30, 1980; and, U.S. Pat. No. 4,057,751 which issued to Bonsignore et al. on Nov. 8, 1977.

Prior art not relating to track lighting systems includes electrical signal transmitting and receiving devices that rely upon electrical power circuits of a building for transmitting signals. For example, prior art devices of this type are manufactured by the X-10 Corporation which include receivers having a plug for insertion into a standard wall outlet and a socket for receiving a standard lighting fixture plug. The receivers include signal responsive switch means which is operatively connected to the plug of the receiver and which controls the current flow to the socket of the receiver. The signal responsive switch means of this prior art receiver typically includes an address which is one of 256 selectable addresses. The switch means responds only to signals directed to the address selected for its receiver. These prior art receivers are used in combination with prior art transmitters. The transmitters also are plugged into standard wall outlets and are operative to generate signals that are transmitted through the electrical power circuitry of the building. More particularly, the transmitter is operative to generate a first signal which identifies at least one specific receiver address and a subsequent signal for identifying a particular switching function to be carried out by the receivers at that address. The prior art transmitters and receivers cooperate with one another to enable remote control of different outlets. For example, the prior art receiver will effectively "hear" its address being signalled by the transmitter, and will adjust the switch means disposed therein in response to the next signal generated by the transmitter. An alternative of the above described prior art system incorporates the receiver into a standard wall-mounted electrical switch. This prior art receiver will perform the same functions as the above described receiver which is pluggable into an outlet. However, these prior art signal systems have generally been adapted for incorporation directly into a single wall outlet either in the form of a switch or a socket. These prior art power line signal responsive switching systems have not been developed for controlling a plurality of different lighting units extending from a single junction box or wall outlet, and particularly have not been adapted for use with track lighting systems.

In view of the above, it is an object of the subject invention to provide a single circuit track lighting system with each light thereon being separately controllable.

It is another object of the subject invention to provide a track lighting system for incorporation into a power line signal carrying switch system which may include components of existing signal systems and which further may include: computers, sensors and alarm systems.

A further object of the subject invention is to provide power line signal responsive switch assemblies incorporated into individual track lighting units of a track lighting system.

Yet another object of the subject invention is to provide power line signal responsive switching adapters selectively engageable with a power track of a prior art track lighting system and mateable to a prior art track lighting unit.

Still an additional object of the subject invention is to provide a power line signal responsive switching unit that can be incorporated into a track lighting system without significantly altering the aesthetic appearance of the track lighting system.

An additional object of the subject invention is to provide a remote control system that is compatible with and can coexist with any available track lighting system.

SUMMARY OF THE INVENTION

The subject invention is directed to a track lighting system comprising at least one elongated power track having a channel with at least one pair of longitudinally extending parallel conductors which are connectable to electrical power lines of a building. The power track employed in the subject invention may be a prior art power track which includes a single circuit and a ground therein.

The track lighting system of the subject invention further may include at least one track lighting unit engageable and disengageable with the conductors of the power track. More particularly, the track lighting unit may include a base having a pair of terminals therein engageable and disengageable with a pair of elongated conductors of the power track. The terminals of the base are electrically connected to the socket means of the track lighting unit for receiving a light bulb.

The track lighting system further includes a signal responsive switching means that responds to signals carried by the electrical power lines of the building and by the parallel conductors of the power track which deliver power to the track lighting unit. The signal responsive switching means is connected in series with the socket means and the load. In one embodiment, the signal responsive switching means may be incorporated into the base of the track lighting unit, which in turn is engageable and disengageable in the track. In another embodiment, the signal responsive switching means of the track lighting unit may be mounted directly in the track lighting housing, and in proximity to the bulb socket. In this latter embodiment, the signal responsive switching means may be mounted directly to a metallic housing for the track lighting unit. In this manner, the housing of the track lighting unit serves to dissipate and radiate heat, such that the heat of the bulb in the track lighting unit and/or heat generated by the signal responsive switching means is dissipated away from the signal responsive switching means.

In still other embodiments, the signal responsive switching means may be incorporated into an adapter which is independently engageable into the power track. The base of the track lighting unit may then be selectively engageable with the adapter. In this embodiment, the power track and the track lighting units may be parts of a prior art track lighting system which is made capable of full remote control functioning by the subject adapters.

In any or all of the above described embodiments, the signal responsive switching means may include address adjustment means at a readily accessible location. The address adjusting means enables the address of a particular signal responsive switch to be selected from a plurality of optional addresses, typically up to 256 optional addresses, such that each signal responsive switch in a system could have a unique address, thereby enabling the associated track lighting unit to respond to signals addressed to it. Alternatively, selected track lighting units may be provided with a common address to enable simultaneous operation.

The system of the subject invention further comprises at least one signal transmitter which is operative to generate signals for controlling the individual signal responsive switches and the track lighting units mated thereto. Each transmitter may include means for generating signals with the unique addresses of the signal responsive switches and means for generating signals for operatively controlling the switches. Each transmitter may further include means for electrical engagement with the wiring of the building in which the track lighting system is employed. In a typical embodiment, a signal transmitter of the subject invention is pluggable into a wall socket such that the address and switch operating instructions are delivered through the wall socket, along the electrical power wires of the building and to the appropriate signal responsive switch. In other embodiments, the signal transmitter may be incorporated directly into a junction box, may define a wall mounted panel, may be incorporated into a wall switch or may be operatively connected to the power system in other ways.

The system of the subject invention may further include timing means operatively connected to the signal transmitter for generating preselected signals at predetermined times. In this regard, the signal transmitter may further include or be used with a microprocessor or general purpose computer such that an adjustable pattern of signals may be generated in accordance with a preprogrammed pattern. Sensors for time, light or movement may also be used with a signal transmitter of the subject invention to generate condition responsive signals that may be received by the signal transmitter and appropriately retransmitted to one or more of the signal responsive switches.

The system may be operative to merely perform on-off switching functions at each track lighting unit. Alternatively, the system may be operative to perform selected dimming and brightening functions.

DETAILED DESCRIPTION OF THE SUBJECT INVENTION

Figure 1:
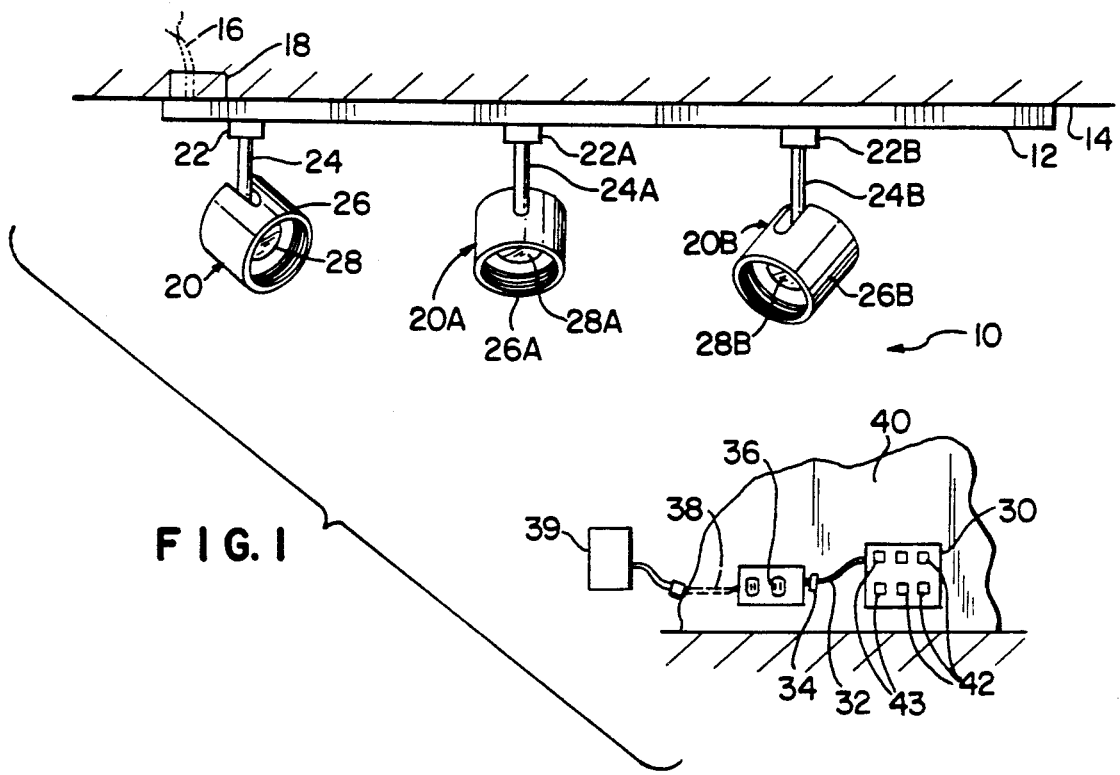
FIG. 1 is a perspective view of a track lighting system in accordance with the subject invention.

The track lighting system of the subject invention is identified generally by the numeral 10 in FIG. 1. The track lighting system 10 includes a power track 12 that is mountable to a ceiling 14 and is electrically connected to the electrical power wires 16 of a building at a junction box 18 in the ceiling 14. It will be understood, however, that the power track 12 may be mounted to a surface other than a ceiling. The power track 12 of the track lighting system 10 is of standard prior art construction. More particularly, as noted above with respect to the prior art system, the power track 12 includes an elongated channel having at least one pair of parallel conductors therein defining parallel power lines and a ground.

The track lighting system 10 further includes a plurality of track lighting units 20, 20A and 20B that are engageable and disengageable in the power track 12. The track lighting units 20, 20A and 20B include bases 22, 22A and 22B respectively that are engageable in the channel of the power track 12. The bases 22, 22A and 22B each include a pair of terminals that are engageable and disengageable with the corresponding plurality of parallel conductors in the power track 12. Connecting arms 24, 24A and 24B extend rigidly from the respective bases 22, 22A and 22B and are hingedly connected to track lighting unit housings 26, 26A and 26B. Insulated conductive leads (not shown) extend through the connecting arms 24, 24A and 24B from the respective bases 22, 22A and 22B to the associated housings 26, 26A and 26B. The conductive leads are electrically connected to sockets (not shown) within the housings 26, 26A and 26B and into which bulbs 28, 28A and 28B are engaged.

Figure 2:
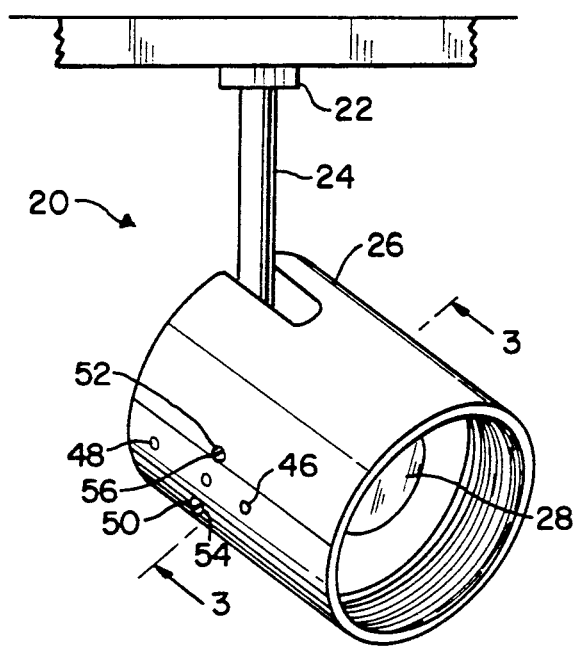
FIG. 2 is a perspective view of an individual track lighting unit in accordance with the subject invention.

It is to be understood that the illustrated embodiments of the track lighting units 20, 20A and 20B are only a few of the many optional configurations of a track lighting unit in accordance with the subject invention. In particular, with reference to FIG. 2, the conductive leads extending from the base 22 to the housing 26 may be disposed externally of the connecting arm 24. Additionally, the connecting arm 24 may take any of a variety of configurations, including generally U-shaped brackets, parallel arms disposed on opposite sides of the housing 26 and various combinations of such embodiments. Furthermore, it is to be understood that although the cylindrical shape of the housing 26 depicted in FIG. 2 is a common shape, many other housing configurations are employed, and are within the scope of the subject invention.

Returning to FIG. 1, each track lighting unit 20, 20A and 20B includes a signal responsive switch incorporated therein and connected in series with the socket/load. As noted above, the signal responsive switches incorporated into each track lighting unit 20, 20A and 20B are operative to detect a signal transmitted through the wires 16 and the power track 12 and to alter the lighting conditions in accordance with the signal.

The track lighting system 10 depicted in FIG. 1 further includes a transmitter 30 having a power cord 32 terminating in a plug 34 which is engageable and disengageable with a standard wall outlet 36. The outlet 36 is electrically connected to wires 38 which extend through the wall 40 of the building in which the track lighting system 10 is disposed. The outlet 36 and wires 38 are part of the power circuitry supplying the building, including the wires 16 leading to the junction box 18 in the ceiling 14 of the building. Although the system 10 is depicted as having only one signal transmitter 30, it is to be understood that additional transmitters may be provided in accordance with the needs and desired operational efficiencies of the system.

The transmitter 30 includes a keyboard control which is operative to generate selected signals which will be transmitted through the wire 32 and plug 34, and to the wire 38 extending through the wall 40 in which the wall socket 36 is mounted. More particularly, the signals generated by the transmitter 30 will be directed through the entire wiring system of the building in which the track lighting system 10 is disposed, including the wires 16 thereof. The keyboard controls of the transmitter 30 include address keys 42 which are operative to generate address signals corresponding to an address for at least one track lighting unit 20, 20A or 20B as explained further below. Additionally, the keyboard controls of the transmitter 30 include switch keys 43 which are operative to generate switching signals to identify a switching command (e.g. on, off, dim, brighten) to be carried out by a signal responsive switch incorporated into the track lighting unit 20, 20A or 20B, which function also is explained in greater detail below. The typical switching command may be to turn a selected light on, off or to adjust the brightness thereof.

The system 10 is further depicted as including condition response switch 39 which is operative to sense a selected condition, such as motion, lighting levels or noise and to generate a signal that will be transmitted through the wires as with the transmitter 30 to trigger an appropriate switching function in the signal responsive switch of at least one track lighting unit 20, 20A, 20B. The condition responsive switch 39 optionally may be used with the transmitter 30, in place of the transmitter 30 or not at all, depending on system needs. Additionally, a plurality of the condition responsive switches 39 may be employed simultaneously as part of a security system.

Figure 3:
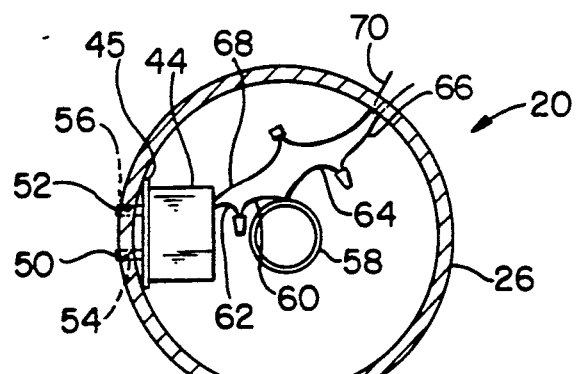
FIG. 3 is a cross-sectional view taken along line 3—3 in FIG. 2.

The track lighting unit 20 is illustrated in greater detail in FIGS. 2 and 3. The track lighting unit 20 includes a signal responsive switch 44 connected in series with the socket/load, and mounted in the track lighting unit 20 to be substantially obscured from view. More particularly, the signal responsive switch 44 is mounted to a metal plate 45 which in turn is mounted to the metal housing 26 of the track lighting unit 20 by threaded screws 46 and 48 which extend through the cylindrical housing 26. The signal responsive switch 44 further includes address selectors 50 and 52 which are in register with apertures 54 and 56 respectively in the housing 26 of the track lighting unit 20. The address selectors 50 and 52 are operative to vary the address of the track lighting unit 20 to enable the track lighting unit 20 to have a unique address as compared to other track lighting units 20A, 20B in the system 10. Alternatively, selected track lighting units in the system 10 can be varied to have identical addresses, and therefore to respond simultaneously to signals generated by the transmitter 30 or other such controller or signal generating means. Each address selector 50, 52 preferably has 16 optional positions to enable a total of 256 unique addresses. The registration of the address selectors 50 and 52 with the apertures 54 and 56 in the housing 26 enable adjustments to the address to be carried out externally of the track lighting unit 20, without the need to disengage the track lighting unit 20 from the track 12 and without the need to disassemble the track lighting unit 20. The address selectors 50 and 52 may be small, and typically about one-quarter inch in diameter to enable adjustments to be completed easily by hand or with readily available tools but without affecting the overall aesthetic appearance of the track lighting unit 20.

The track lighting unit 20 further includes a bulb socket 58 which is electrically connected in series with the signal responsive switch 44. In particular, wire 60 from the socket 58 is spliced to wire 62 from the switch 44. Wire 64 extends from the bulb socket 58 and is spliced to wire 66 which further extends into the connecting arm 24 and to the base 22 for supplying electrical power to the track lighting unit 20. Wire 68 extends from the signal responsive switch 44 and is spliced to wire 70 which also extends into the connecting arm 24 and to the base 22 for supplying power to the track lighting unit 20. The socket 58 is configured to threadably receive the bulb 28 as shown in FIGS. 1 and 2. The bulb 28 may be a high wattage flood or spot light which can generate significant heat. The metal plate 45 disposed between the switch 44 and the housing 26 of the track lighting unit 20 is operative to dissipate heat away from the switch 44.

Figure 4:
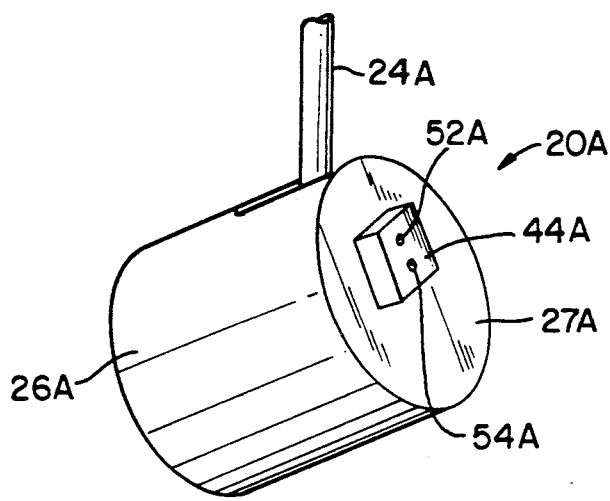
FIG. 4 is a perspective view of a second embodiment of a track lighting unit in accordance with the subject invention.

A second embodiment of the invention is illustrated in FIG. 4. In particular, FIG. 4 illustrates the track lighting unit 20A which has a housing 26A having a generally planar rear wall 27A. A signal responsive switch 44A is mounted externally on the rear wall 27A of the housing 26A. Although a rectangular switch 44A is depicted in FIG. 4, other external configurations can be provided to conform to the aesthetic requirements of the track lighting system 10. The signal responsive switch 44A of FIG. 4 includes wires (not shown) which extend into the housing 26A for appropriate electrical series connection to the socket of the track lighting unit 20A and the power lines extending through the connecting arm 24A. In this regard, the electrical connections may be similar to those depicted in FIG. 3. The signal responsive switch 44A includes address selectors 52A and 54A disposed at an accessible location on the track lighting unit 20A for providing the track lighting unit 20A with a unique address, or alternatively with an address identical to selected other track lighting units 20, 20B in the system 10.

Figure 5:
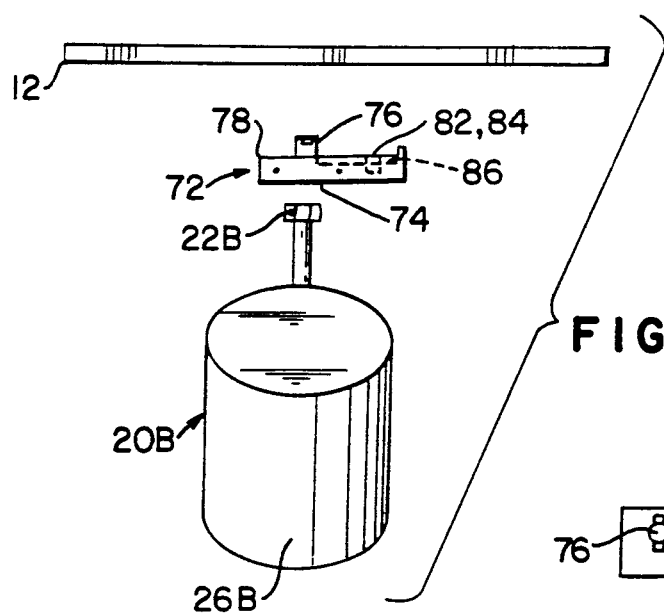
FIG. 5 is an exploded elevational view of a third embodiment of a track lighting system in accordance with the subject invention.
Figure 6:
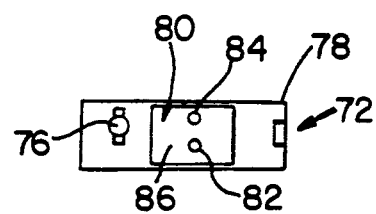
FIG. 6 is a top plan view of the adapter shown in FIG. 5.

A third alternate track lighting unit 20B is depicted in FIGS. 5 and 6. The third track lighting unit 20B is substantially identical to a prior art unit and includes a base 22B for electrical connection to the power track 12, a connecting arm 24B extending from the base 22B and a housing 26B mounted on the connecting arm 24B. As in the previously described embodiments, the track lighting unit 20B includes a bulb socket (not shown) disposed therein for receiving a bulb 28B as shown in FIG. 1. Additionally, the track lighting unit 20B includes appropriate internal circuitry to provide electrical power between the base 22B and the socket within the housing 26B, as shown for example in FIG. 3. The track lighting unit 20B further includes an adapter 72 having a socket 74 and a track plug 76. The socket 74 is dimensioned and configured to receive the electrical terminals on the base 22B of the track lighting unit 20B. The track plug 76 is dimensioned and configured to be received in the channel of the power track 12 of the track lighting system 10. More particularly, the track plug 76 includes terminals that are selectively engageable with the parallel conductors of the power track 12. The adapter 72 further includes a housing 78 having a signal responsive switch 80 disposed therein. The switch 80 is functionally substantially identical to the switches 44 and 44A described and illustrated above. Furthermore, the signal responsive switch 80 in the adapter 72 is provided with address selectors 82 and 84 which are accessible through the top wall of the adapter housing 78 facing the power track 12 to enable appropriate adjustments to the address of the adapter 72 with no effect on the external aesthetic appearance. Thus, adjustments to the adapter 72 enable positive control of the track lighting unit 20B as had been described with the previous embodiments. The address selectors 82 and 84 preferably are recessed in the top wall of the housing 78 to avoid mechanical interference with the power track 12. The adapter 72 further includes a heat dissipation plate 86 mounted to the top wall of the housing 78 and operative to dissipate heat away from the signal responsive switch 80. All existing halogen or incandescent track heads are attachable since the adapter 72 is compatible with the existing power track 12.

In summary, a track lighting system is provided which includes an elongated power track having at least one pair of longitudinally extending parallel conductors therein. The conductors of the power track are electrically connected to electrical power circuitry in a building. The track lighting system further includes at least one and preferably a plurality of track lighting units which are electrically and mechanically engageable with the power track at selected locations therealong. Each track lighting unit includes a signal responsive switch operatively connected thereto or is engageable with an adapter having a signal responsive switch. The signal responsive switch responds to signals transmitted over the electrical power lines of the building. The signal responsive switch may include address selectors for ensuring that each track lighting unit has a unique address, or for selectively providing a plurality of track lighting units with an identical address. The signal responsive switch may be mounted internally to the housing of the track lighting unit, externally to the housing of the track lighting unit or may be provided in a separate adapter that is selectively engageable with the power track and with the track lighting unit. The track lighting system further includes at least one transmitter that is mateable with the building circuitry at a location separate from the track lighting system units. The transmitter is operative to generate signals that are received by the signal responsive switches of the track lighting unit to operate the track lighting units.

While the invention has been described with respect to certain preferred embodiments, it is understood that various changes can be made without departing from the scope of the invention as defined by the appended claims. In particular, track lighting systems having more or fewer track lighting units than those depicted in the Figures can be provided. Other configurations for track lighting units may be employed as can other configurations or locations for the signal responsive switch. The system may further include a plurality of separate power tracks which are controlled by a single transmitter or plural transmitters for controlling a single track or system. The transmitter may further define or include a computer or microprocessor, and may be hard wired directly into the electrical power circuitry of the building in which the track lighting unit is employed. As noted above, these and other variations will be apparent to a person having ordinary skill in this art.

I claim:

1. In a track lighting system having at least one single circuit power track defining a channel with a pair of parallel conductors adjacent to the channel, said conductors of said power track being electrically connected to electrical power lines in a building, said track lighting assembly further including a plurality of track lighting units, each said track lighting unit including a plug with a pair of terminals engageable and disengageable with the respective conductors in the power track, a signal transmitter engageable with the electric power lines of the building, said signal transmitter being operative to generate address signals receivable by a selected signal responsive switch and switching signals receivable by the selected signal responsive switch, wherein the improvement comprises:

at least one signal responsive adapter for the track lighting system, said adapter having a housing with opposed top and bottom walls, a signal responsive switch disposed in the housing between the top and bottom walls, said signal responsive switch including adjustable address means for defining a selected address for said signal responsive switch and switching means operatively connected to the adjustable address means for performing switching functions in response to received signals, the adjustable address means being accessible through the housing for permitting adjustments of the address through the housing, a plug extending from the top wall of the housing and being operatively connected to the signal responsive switch, the plug including a pair of terminals engageable and disengageable with the pair of parallel conductors in the single circuit power track, a socket extending into the bottom wall of the housing of the adapter and including a pair of terminals electrically connected to the signal responsive switch and engageable and disengageable with the terminals of one of said track lighting units, whereby the adapter is engaged with the single circuit power track such that the terminals of the plug of the adapter are electrically connected to the parallel conductors in the channel of the power track, and whereby the plug of a selected one of the track lighting units is engaged in the socket of the adapter such that the signal transmitter can be operated to control the track lighting unit engaged with the adapter.

2. A system as in claim 1 wherein said address means is recessed in the top wall of the adapter for preventing mechanical interference with the power track and for substantially obscuring the address means in use.

3. A system as in claim 1 wherein the adapter further comprises a metallic heat dissipation plate in contact with said signal responsive switch for dissipating heat therefrom.

* * * * *